US009305595B2

(12) United States Patent
Hwang et al.

(10) Patent No.: US 9,305,595 B2
(45) Date of Patent: Apr. 5, 2016

(54) READER SEPARATION DEPENDENT LINEAR AND TRACK DENSITY PUSH FOR ARRAY READER BASED MAGNETIC RECORDING

(71) Applicant: LSI Corporation, San Jose, CA (US)

(72) Inventors: Eui Seok Hwang, Palo Alto, CA (US); George Mathew, San Jose, CA (US)

(73) Assignee: Avago Technologies General IP (Singapore) Pte. Ltd.

( * ) Notice: Subject to any disclaimer, the term of this patent is extended or adjusted under 35 U.S.C. 154(b) by 115 days.

(21) Appl. No.: 14/225,409

(22) Filed: Mar. 25, 2014

(65) Prior Publication Data

US 2015/0221333 A1    Aug. 6, 2015

Related U.S. Application Data

(60) Provisional application No. 61/935,316, filed on Feb. 3, 2014.

(51) Int. Cl.
*G11B 27/36* (2006.01)
*G11B 21/02* (2006.01)
*G11B 20/12* (2006.01)
*G11B 20/10* (2006.01)

(52) U.S. Cl.
CPC ...... *G11B 20/1217* (2013.01); *G11B 20/10009* (2013.01); *G11B 27/36* (2013.01)

(58) Field of Classification Search
None
See application file for complete search history.

(56) References Cited

U.S. PATENT DOCUMENTS

| 6,445,525 | B1 * | 9/2002 | Young | 360/51 |
| 6,522,494 | B1 | 2/2003 | Magee | |
| 7,379,257 | B2 | 5/2008 | Yamagishi | |
| 8,760,782 | B1 | 6/2014 | Garani | |
| 8,947,812 | B1 | 2/2015 | Wang | |
| 2015/0170676 | A1 * | 6/2015 | Hwang | G11B 5/3954 360/64 |

OTHER PUBLICATIONS

George Mathew et al., "Capacity Advantage of Array-Reader Based Magnetic Recording for Next Generation Hard Disk Drives," Digests of the 24th Magnetic Recording Conference TMRC 2013, Aug. 20-22, 2013, pp. i-ii, 1, and 58-59.
Nuno Miguel De Figueiredo Garrido, "Available Techniques for Magnetic Hard Disk Drive Read Channel Equalization," NM de Figueiredo Garrido, Jul. 8, 2013, pp. 1-13.

* cited by examiner

*Primary Examiner* — Regina N Holder

(57) ABSTRACT

A method of operating a multi-reader two-dimensional magnetic recording system includes determining a position of a multi-reader head of the multi-reader two-dimensional magnetic recording system, determining an areal density push according to the position of the multi-reader head, and performing an operation to read data from or write data to a magnetic recording medium according to the areal density push.

24 Claims, 6 Drawing Sheets

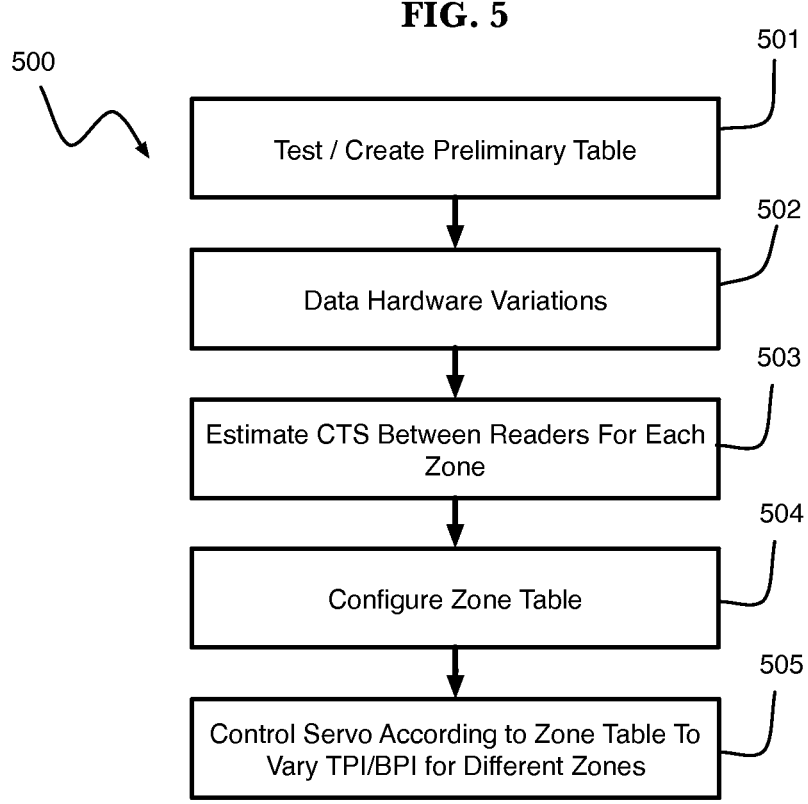

READER SEPARATION DEPENDENT LINEAR AND TRACK DENSITY PUSH FOR ARRAY READER BASED MAGNETIC RECORDING

CROSS-REFERENCE TO RELATED APPLICATIONS

This application claims the benefit of U.S. Provisional Patent Application No. 61/935,316 filed on Feb. 3, 2014, the complete disclosure of which is expressly incorporated by reference herein in its entirety for all purposes.

FIELD OF INVENTION

The present invention relates generally to electrical and electronic circuitry, and more particularly relates to magnetic recording in a system having multiple sensors.

BACKGROUND

The magnetic disk drive recording industry continues to pursue advances in technology that will sustain enhancements in recording density in a cost-effective manner. Two approaches currently under investigation are Bit Patterned Media Recording (BPMR) and Heat-Assisted Magnetic Recording (HAMR). An objective of these approaches is to overcome challenges posed by the super-paramagnetic limit that imposes a trade-off among three fundamentally competing recording parameters: media Signal-to-Noise Ratio (SNR), writability, and thermal stability. BPMR and HAMR, however, require modifications to the media and heads, which significantly increase costs. Another technology, Two-Dimensional Magnetic Recording (TDMR), which uses conventional media and a new multiple-head configuration, relies on powerful signal processing in an attempt to achieve a theoretical limit of one bit-per-grain recording density.

As a practical near-term milestone, Array-Reader Based Magnetic Recording (ARMR) has been proposed to increase areal density with an array-reader and associated signal processing.

SUMMARY

In accordance with an embodiment of the invention, a method of operating a multi-reader two-dimensional magnetic recording system includes determining a position of a multi-reader head of the multi-reader two-dimensional magnetic recording system, determining an areal density push according to the position, and performing an operation to read data from or write data to a magnetic recording medium according to the areal density push. Other embodiments of the invention include, but are not limited to, being manifest as a multi-reader TDMR system, a computer program product, and a data storage system. Additional and/or other embodiments of the invention are described in the following written description, including the claims, which is to be read in connection with the accompanying drawings.

BRIEF DESCRIPTION OF THE FIGURES

The following drawings are presented by way of example only and without limitation, wherein like reference numerals (when used) indicate corresponding elements throughout the several views, and wherein:

FIG. 5 is a flow diagram of a method for skew-dependent TPI and BPI push in a write operation, in accordance with one or more embodiments of the present invention.

Figure 1:
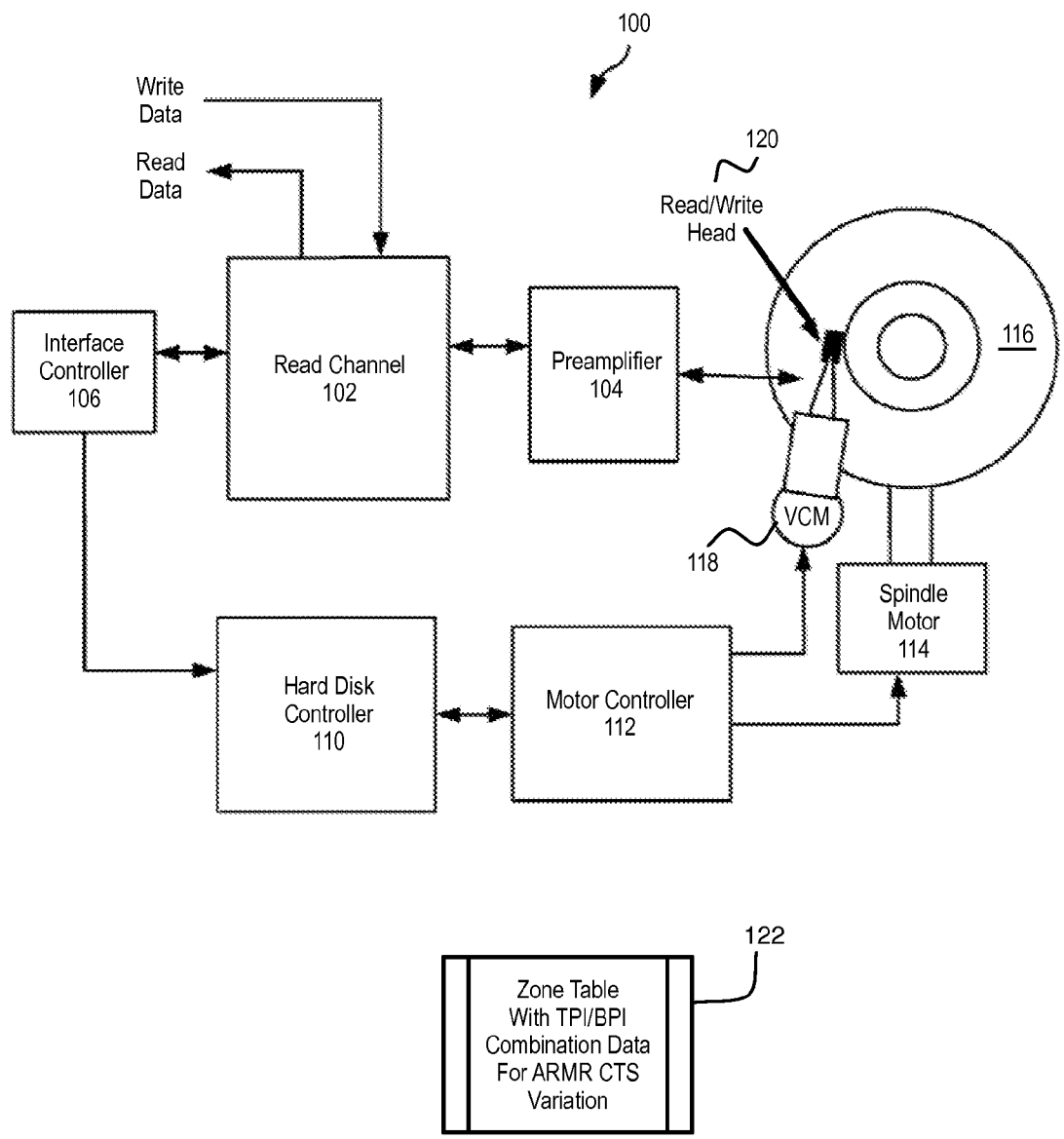
FIG. 1 depicts a storage device including cross-talk separation (CTS)-dependent areal density push circuitry, in accordance with one or more embodiments of the present invention.

It is to be appreciated that the drawings described herein are presented for illustrative purposes only. Moreover, common but well-understood elements and/or features that may be useful or necessary in a commercially feasible embodiment may not be shown in order to facilitate a less hindered view of the illustrated embodiments.

DETAILED DESCRIPTION

Embodiments of the invention will be described herein in the context of illustrative array-reader based magnetic recording (ARMR) systems for use, for example, in a data storage application. It should be understood, however, that embodiments of the invention are not limited to these or any other particular ARMR arrangements. Rather, embodiments of the invention are more broadly applicable to techniques for improving read performance of a magnetic storage device. In this regard, embodiments of the invention provide an apparatus and methodology for beneficially varying bits per inch (BPI/linear bit density) and tracks per inch (TPI/radial track density), in a write operation, for each zone of a magnetic disk based on predicted cross-track separation (CTS) of readers of a multi-reader head from an estimated zero skew separation, noted as $CTS_0$, and skew angle in an ARMR system. Moreover, it will become apparent to those skilled in the art given the teachings herein that numerous modifications can be made to the illustrative embodiments shown that are within the scope of the claimed invention. That is, no limitations with respect to the embodiments shown and described herein are intended or should be inferred.

As a preliminary matter, for purposes of clarifying and describing embodiments of the invention, the following table provides a summary of certain acronyms and their corresponding definitions, as the terms are used herein:

Table of Acronym Definitions

| Acronym | Definition |
| --- | --- |
| BPMR | Bit Patterned Media Recording |
| HAMR | Heat-Assisted Magnetic Recording |
| SNR | Signal-to-noise ratio |
| TDMR | Two-dimensional magnetic recording |
| ARMR | Array-Reader Based Magnetic Recording |
| PMR | Perpendicular Magnetic Recording |
| TP | Track Pitch |

-continued

Table of Acronym Definitions

| Acronym | Definition |
| --- | --- |
| kBPI | kilo-bits per inch |
| kTPI | kilo-tracks per inch |
| ITI | Inter-track interference |
| ASIC | Application-specific integrated circuit |
| DTS | Down-track separation (between readers) |
| CTS | Cross-track separation (between readers) |
| ID | Inner-diameter (of the disk) |
| MD | Mid-diameter (of the disk) |
| OD | Outer diameter (of the disk) |
| OTER | On-track error rate |
| OTC | Off-track capability |
| BER | Bit error rate |
| SS | Small separation |
| LS | Large separation |
| ADC | Areal density capability |
| RAID | Redundant array of independent devices |
| HDD | Hard disk drive |
| SSD | Solid-state drive |

As previously stated, one problem with Bit Patterned Media Recording (BPMR) and Heat-Assisted Magnetic Recording (HAMR) is that these approaches require substantial modifications to the media and heads, which significantly increase costs. ARMR is seen as an intermediate approach between current Perpendicular Magnetic Recording (PMR) and Two-Dimensional Magnetic Recording (TDMR), which provides a significant increase in storage density compared to PMR while avoiding the challenges posed by BPMR and HAMR. ARMR uses standard media and an array of read-elements, also referred to herein as a multi-reader head, in conjunction with changes in read-back signal processing to achieve improved Signal-to-Noise Ratio (SNR) of a track that is being read.

Figure 2A:
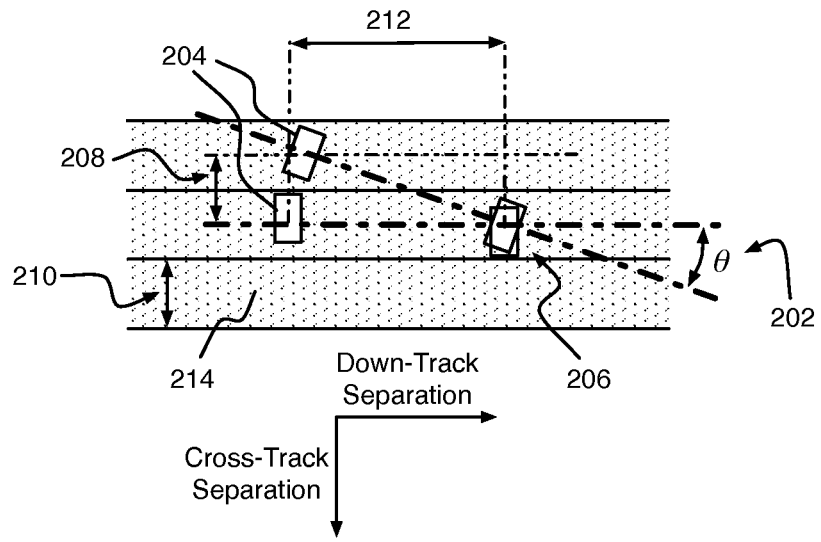
FIGS. 2A-C illustrate skew angle and reader CTS, in accordance with one or more embodiments of the present invention.
Figure 2B:
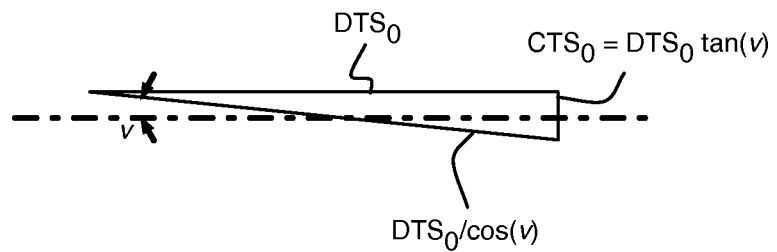
Figure 2C:
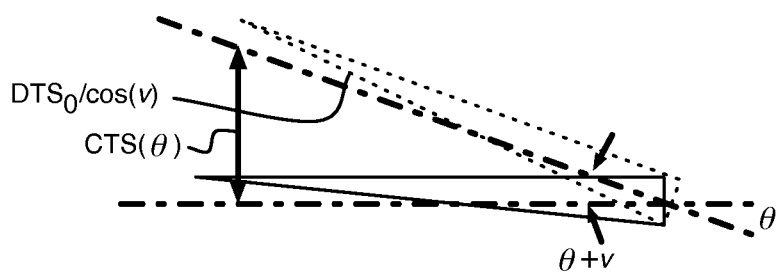

ARMR achieves areal density gain by employing multi-dimensional joint signal processing of multiple read-back signals from the array reader. Embodiments of the invention are shown and described herein in the context of a multi-reader head including two read-elements (i.e., readers) that are positioned according to a prescribed CTS and Down-Track Separation (DTS). Due to skew, among other factors (e.g., temperature, vibration, etc.), the effective CTS between readers varies. Further, the larger the DTS between read-elements without skew (i.e., a skew angle of zero), denoted by $DTS_0$ or d, the more the CTS will vary with skew. This is illustrated in FIGS. 2A-C, which are further described herein. While exemplary embodiments of the invention are described herein in the context of a multi-reader head including two read-elements, it is to be appreciated that embodiments of the invention are not limited to any specific number of read-elements.

TDMR is a known recording architecture intended to support storage densities beyond those of conventional recording systems. TDMR utilizes multiple read-elements to read from multiple adjacent tracks and uses joint signal processing and detection to decode the signal from a target track. The gains achieved from TDMR come primarily from more powerful coding and signal processing algorithms that allow data bits to be stored more densely on a magnetic storage medium (e.g., disk). In traditional disk architectures with a single read-element, reading a single sector with TDMR generally involves reading the sectors on adjacent tracks, requiring additional disk rotations. To circumvent this problem, TDMR disk drives may use multiple read-elements, also referred to as a multi-reader head, on the same support arm, typically referred to as a slider, thus restoring traditional read service times through ARMR processes.

According to an embodiment of the present invention, ARMR and TDMR can be implemented in conjunction with other advanced technologies as well. For example, ARMR/TDMR can be used for BPMR where track pitch is high.

Turning to FIG. 1, a storage system 100 including a read channel circuit 102 having a CTS-dependent areal density push is shown, in accordance with one or more embodiments of the present invention. Storage system 100 also includes a preamplifier 104, an interface controller 106, a hard disk controller 110, a motor controller 112, a spindle motor 114, a magnetic recording medium 116 (e.g., disk platter), and a read/write head (or multi-reader head) assembly 120. According to exemplary embodiments of the invention, the read/write head assembly 120 includes an array of readers or multiple read heads in ARMR and a separate writer or write head (not explicitly shown, but implied). It should be understood that embodiments of the present invention are not limited to any particular read/write head assembly described herein, and that other configurations of read/write head assemblies are considered embodiments of the invention consistent with ARMR. In one embodiment, the interface controller 106 controls addressing and timing of data to and from the magnetic recording medium 116. The data on the magnetic recording medium 116 can be stored in the form of magnetic signals recorded in accordance with either a longitudinal or a perpendicular recording scheme. The data can be recovered or detected by the read/write head assembly 120 when the assembly is properly positioned over the magnetic recording medium 116. In one embodiment, the read/write head assembly 120 includes a voice coil motor (VCM) control module 118. The position of the read/write head assembly 120 can be determined by the motor controller 112, the VCM control module 118, a dedicated sensor (not shown), etc. It is to be understood that embodiments of the invention are not limited to any specific storage system and that this disclosure is intended to cover any and all adaptations or variations of various embodiments configured to perform operations with CTS-dependent areal density push.

The storage system 100 further includes a zone table 122 including data for skew-dependent TPI and/or BPI push reflecting an ARMR CTS variation effect, which is accessible to the read channel 102. It should be understood that the zone table 122 can be stored in any device accessible to the read channel 102.

FIGS. 2A-C illustrate how reader CTS varies with skew angle 202. According to an exemplary embodiment of the invention, the skew angle is the relative angle between the multi-reader head and the track being read. In FIG. 2A, a multi-reader head is illustrated being disposed at two different skew angles; namely, 0 and θ degrees. It follows that the difference between the two different skew angles is θ 202. The multi-reader head includes two readers, 204 and 206, shown disposed relative to one another for each of the two skew angles. A certain CTS 208 occurs between the two readers given the skew angle θ and is denoted by CTS(θ). Note, that DTS 212 decreases with increasing skew angle. It should also be understood that, in one or more embodiments, CTS and DTS are measured in terms of track pitch (TP) 210 (three tracks, e.g., 214, are shown in FIG. 2A). For example, DTS=2TP means that the down-track separation of two readers of the multi-reader head is equal to two times the track pitch, irrespective of skew angle.

FIG. 2B illustrates the CTS and DTS between two readers at zero-degree skew angle, denoted by $CTS_0$ and $DTS_0$, respectively, with v denoting an angle of separation between the readers at zero skew. It should be understood that a multi-reader head having a shorter DTS experiences smaller CTS variations for the same skew angle (e.g., CTS variation is smaller for a multi-reader head having DTS=2TP, compared to that of a multi-reader head having DTS=6TP).

From FIG. 2C, a relationship describing the variation of CTS with skew angle for a given $DTS_0$ and $CTS_0$, in accordance with an illustrative embodiment, is written as:

$$CTS(\theta) = DTS_0 / \cos\nu \sin(\theta + \nu)$$
$$= DTS_0 / \cos\nu (\sin(\theta)\cos(\nu) + \cos(\theta)\sin(\nu))$$
$$\rightarrow CTS(\theta) = DTS_0 \sin(\theta) + CTS_0 \cos(\theta) \sim CTS_0 + DTS_0 \theta \text{ for small } \theta.$$

Here, a small $\theta$ can be between, for example, about −16 degrees and +16 degrees. In another embodiment, the range of $\theta$ is between about −16 degrees and +20 degrees. Different hardware (e.g., different disk platters or magnetic recording medium and different read-elements) can have different ranges of skew angle. It is to be understood, however, that embodiments of the invention are not limited to any specific angle or range of angles.

Figure 3:
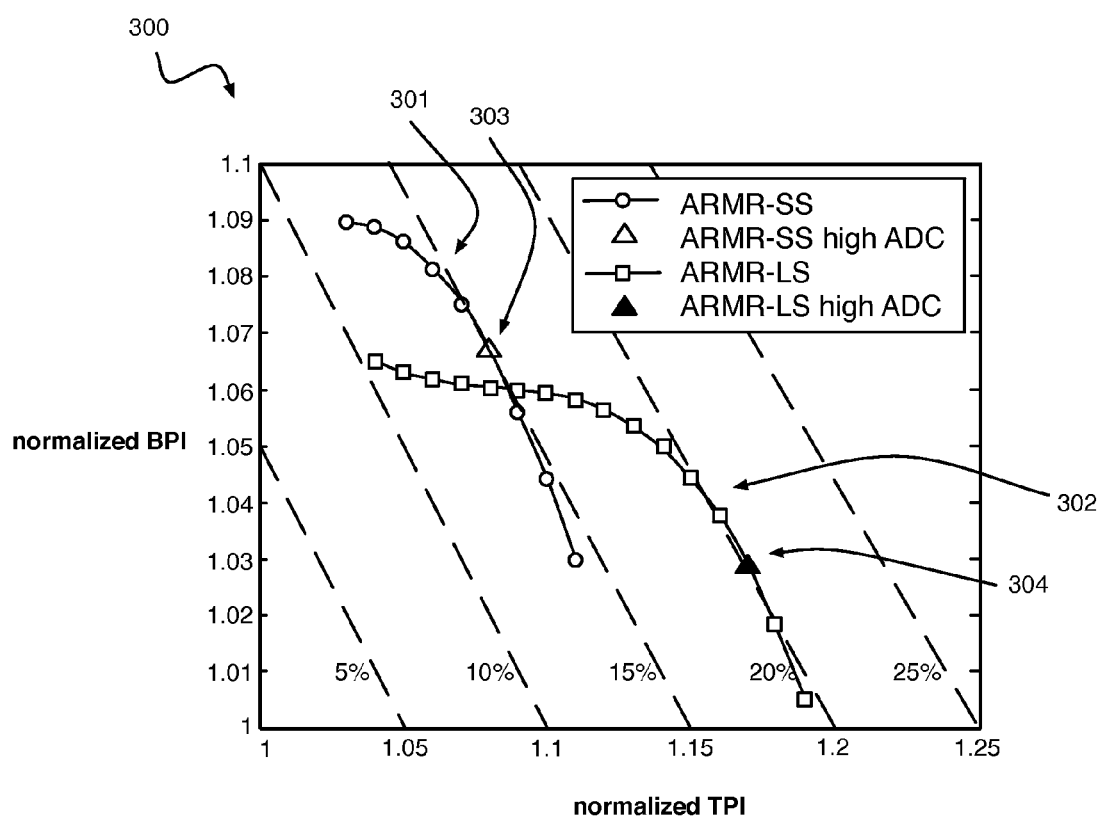
FIG. 3 is a graph of skew-dependent tracks-per-inch (TPI) and bits-per-inch (BPI) push, in accordance with one or more embodiments of the present invention.

According to exemplary embodiments of the invention, dual-head ARMR provides significant areal density gain compared to other magnetic recording approaches. Dual-head ARMR performance is sensitive to the cross-track separation between two readers. More particularly, a smaller separation typically improves performance for on-track error rate (OTER), while a larger separation typically improves performance for off-track capability (OTC). The actual separation between the two readers will vary due to skew, among other factors. Zero-skew CTS also varies between different hardware. FIG. 3 is a graph 300 showing illustrative results for an exemplary storage system in which improved areal density for small separation is expected with high BPI push compared to a nominal condition (see plot 301 for a mid-diameter (MD) zone of a magnetic disk), while improved areal density for large separation is expected with high TPI push compared to a nominal condition (see plot 302 for an Outer Diameter (OD) zone of the magnetic disk).

As used herein, the term "push" refers broadly to a separation between tracks or bits and can be measured as an increase in areal density (e.g., a 10% increase in areal density). Further, it should be understood that FIG. 3 is shown by way of example only and without limitation, and different plots and relationships may be determined for different hardware, as will become apparent to those skilled in the art given the teachings herein.

Exemplary embodiments of the invention improve overall disk drive performance with two-reader ARMR through kilo-bits per inch (kBPI) (a measure of linear recording density) and kilo-tracks per inch (kTPI) (a measure of track density) push at an outer-diameter (OD) peripheral region (OD region/large area), increasing overall per-platter areal density capability (ADC) significantly. It is to be understood that embodiments of the invention are not limited to any specific number of readers.

Exemplary embodiments of the invention use skew-dependent TPI and/or BPI push for dual-head ARMR. In one or more embodiments BPI and TPI are adaptively changed for each zone of the magnetic disk based on predicted cross-track separation from an estimated zero skew separation and skew angle. A zone table of the ARMR hardware (see for example, FIG. 1) can be modified to include data for controlling BPI and TPI push.

Referring again to FIG. 3, an achievable (e.g., optimal) TPI and BPI depends on skew. FIG. 3 is an illustrative example of (TPI,BPI) combination providing an achievable OTER or OTC for different separation, measured relative to a disk without variable push. For example, 1.1 on the normalized BPI would be a 10% increase in density. It can be seen from the exemplary data of FIG. 3 that a high areal density for small separation (SS), e.g., at about 303, is expected with high BPI push, compared to a nominal condition; a high areal density for large separation (LS), e.g., at about 304, is expected with high TPI push compared to the nominal condition. It should be understood that, according to at least one embodiment of the present invention, the SS condition corresponds to operations in the MD zone (e.g., |CTS|<0.2 TP) and the LS condition corresponds to operations in the OD zone (e.g., |CTS|>0.2 TP). A dual-head ARMR according to an exemplary embodiment of the present disclosure selects a point from a zone table, including data for TPI and BPI dependent on skew, to increase areal density for each zone and thereby increase overall disk capacity.

Figure 4A:
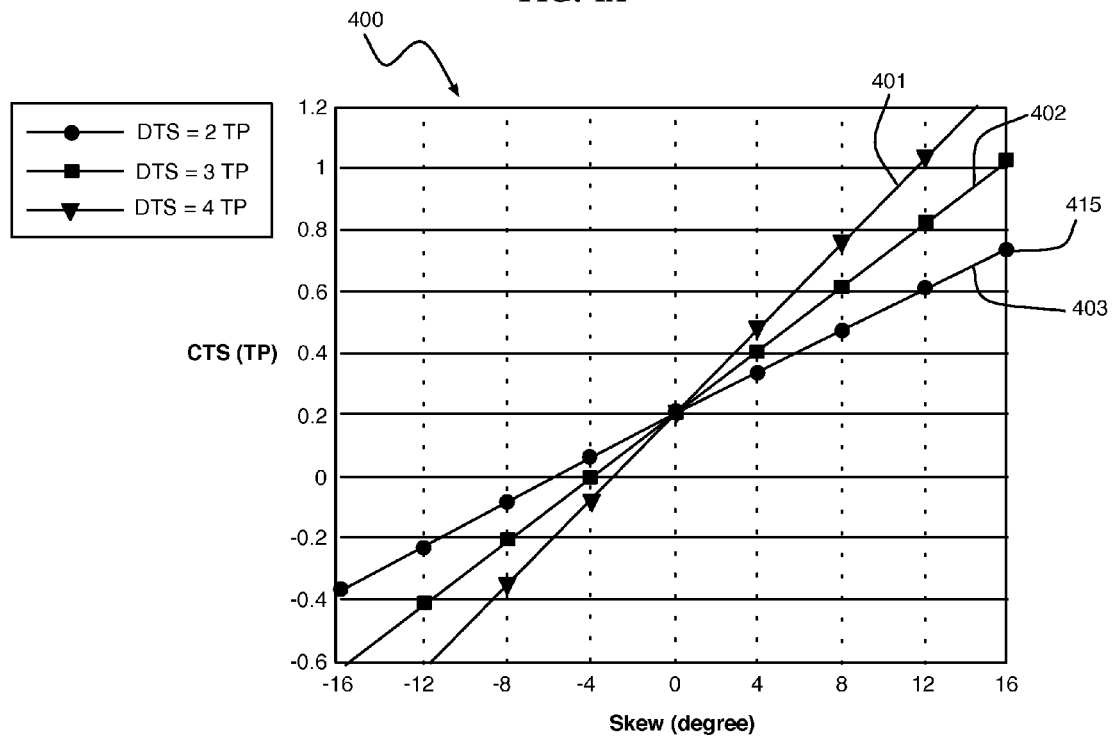
FIGS. 4A-B show CTS as a function of skew angle, in accordance with one or more embodiments of the present invention.

Referring now to FIG. 4A, in at least one exemplary embodiment, a zone table includes performance evaluations at different skew angles, as depicted in graph 400. Exemplary results are shown in FIG. 4A. Such a design may incorporate the different performance envelopes of the graph 400 of FIG. 4A (e.g., 401, 402, 403) according to the DTS of the corresponding multi-reader head. The zone table (e.g., 122 in FIG. 1), giving different combinations of skew angle and CTS, is accessible to the read channel and is updated to include the TPI/BPI combination data reflecting the ARMR CTS variation effect.

Figure 4B:
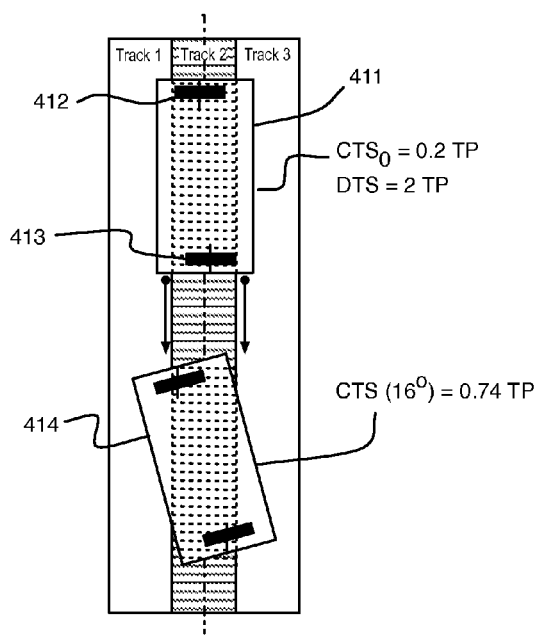

FIG. 4B illustrates a multi-reader head having a DTS=2 TP (e.g., see plot 403 of FIG. 4A). At a skew of 0 degrees ($CTS_0$) in a first zone of the magnetic recording medium (e.g., at 411) the CTS of a first read head 412 and a second read head 413 is 0.2 (i.e., 0.2 TP). At a skew of 16 degrees in a second zone of the magnetic recording medium (e.g., at 414), the CTS of the first read head and the second read head is 0.74 TP (see data point 415, FIG. 4A).

In FIG. 5, an exemplary method 500 of operating the read channel 102 of FIG. 1 is shown. According to an exemplary embodiment, a zone table (e.g., 122 of FIG. 1) is configured with different (TPI,BPI) for achieving improved areal density gain. At block 501, a preliminary table of (TPI,BPI) for target ADC given the dual-head CTS for the target drive design is configured. The preliminary table can be configured during a test at a spin stand with a dual-head sample showing designated separation (dual-head sample to sample variations will be counted at block 502). TPI and BPI push tests for select separations, e.g., three separations at inner-diameter (ID), MD, and OD, are used to obtain the ADC contours for (TPI, BPI) for each separation. An achievable (e.g., at or approaching a measure of optimal) (TPI,BPI) can be interpolated for other separations from the select separation results. It should be understood that other methods of obtaining the (TPI,BPI) can be performed (e.g., testing all separations).

At block 502, a zero-skew CTS and DTS are estimated for each drive (depending on the dual-head sample). Here, variations in zero-skew CTS and DTS between hardware can be accounted for. In one exemplary embodiment, block 502 is optional, such that the preliminary table can be used for different hardware without adapting the zone table to a particular hardware. In one or more embodiments, block 502 is optional in a case where the zero-skew CTS and/or DTS are provided by a manufacturer.

At block 503, the CTS between two readers for each zone is estimated according to the equation discussed in connection with FIG. 2C above.

At block 504, the zone table is configured with the (TPI, BPI) data. In one embodiment, the data includes the preliminary table, and the data of each zone with a corresponding dual-head ARMR gain optimized (TPI,BPI) combination.

At block 505, a servo of the VCM (e.g., 118 in FIG. 1) is controlled, varying data TPI for different zones, using the zone table (e.g., 122 in FIG. 1). Servo TPI can be kept the same and the controller can use the data TPI information from the zone table to interpret/guide servo control.

As will be appreciated by one skilled in the art, embodiments of the present invention may be implemented as an apparatus, system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to as a "circuit," "module" or "system." Furthermore, embodiments of the present invention may take the form of a computer program product embodied in one or more non-transitory machine-readable medium(s) having machine-readable program code embodied thereon.

The block diagrams in the figures depict illustrative architectures, functionality, and operation of implementations of systems, methods and computer program products according to embodiments of the present invention. In this regard, each block shown in the block diagrams may represent a module, segment, or portion of code, which comprises one or more executable instructions for implementing specified functions. It should also be noted that, in one or more embodiments, functions represented by the blocks may occur out of the order noted in the figures. For example, two blocks shown in succession may, in fact, be executed substantially concurrently, or the blocks may sometimes be executed in the reverse order, depending upon the functionality involved. It will also be appreciated that each block of the block diagrams, and combinations of blocks in the block diagrams, can be implemented by special purpose hardware-based systems that perform the specified functions or acts, or combinations of special purpose hardware and computer instructions.

It should be understood that any of the methods described herein can include an additional step of providing a system comprising distinct software modules embodied on a non-transient computer-readable storage medium; the modules include, in one or more embodiments, any or all of the elements depicted in the block diagrams and/or described herein; by way of example and not limitation, a first test module determining a data of preliminary zone table (see for example, block 501, FIG. 5), a second test module determining data for a particular multi-reader head (see for example, block 502, FIG. 5), a CTS estimating module (see for example, block 503, FIG. 5), a zone table configuring module (see for example, 504, FIG. 5), and a servo control module (see for example, 505, FIG. 5). The method steps can then be carried out using the distinct software modules and/or sub-modules of the system, executing on one or more hardware processors. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASIC(s)), functional circuitry, one or more appropriately programmed general purpose digital computers with associated memory, and the like. Given the teachings of the invention provided herein, one of ordinary skill in the related art will be able to contemplate other implementations of the components of the invention.

In an integrated circuit implementation of one or more embodiments of the invention, multiple identical die are typically fabricated in a repeated pattern on a surface of a semiconductor wafer. Each such die may include a device described herein, and may include other structures and/or circuits. The individual dies are cut or diced from the wafer, then packaged as integrated circuits. One skilled in the art would know how to dice wafers and package die to produce integrated circuits. Any of the exemplary circuits illustrated in the accompanying figures, or portions thereof, may be part of an integrated circuit. Integrated circuits so manufactured are considered part of this invention.

Figure 6:
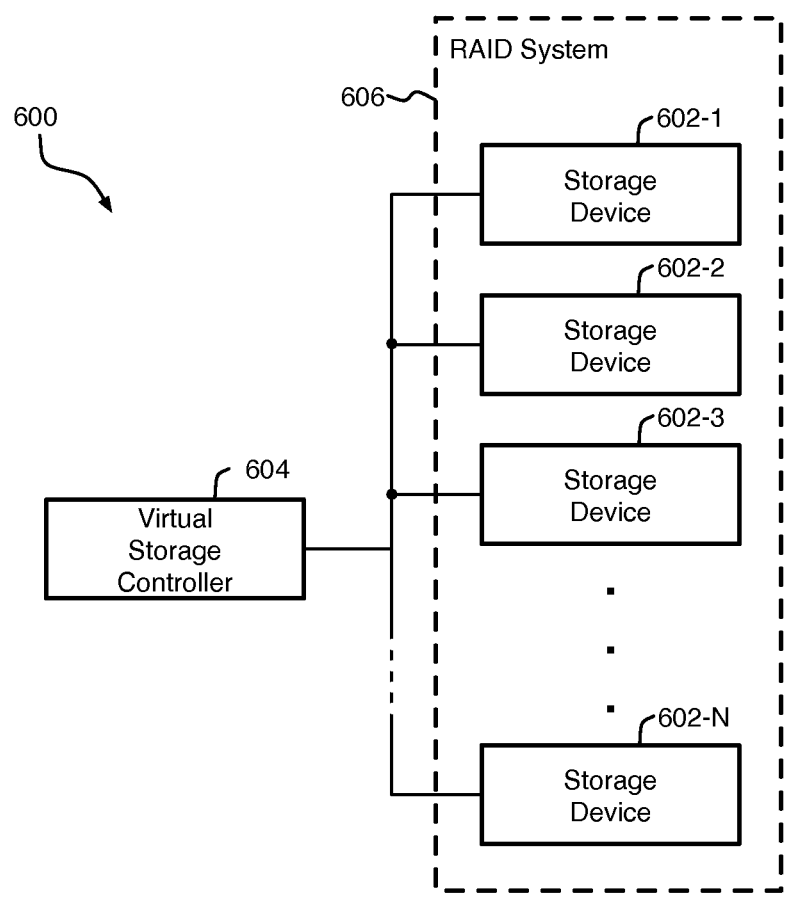
FIG. 6 is a block diagram depicting at least a portion of an exemplary virtual storage system comprising multiple storage devices, at least one of the storage devices incorporating techniques for implementing CTS-dependent areal density push according to an embodiment of the invention.

Embodiments of the invention are suitable for use in conjunction with a virtual storage system 600 comprising multiple storage devices 602-1 through 602-N, possibly of multiple different types, as illustrated in FIG. 6. For example, the storage devices 602-1 through 602-N may be implemented using all hard disk drives (HDDs), all solid-state drives (SSDs), or using a combination of one or more HDDs and one or more SSDs. Other storage device types are similarly contemplated. The virtual storage system 600, also referred to as a storage virtualization system, illustratively comprises a virtual storage controller 604 coupled with a redundant array of independent devices (RAID) system 606. As will be known by those skilled in the art, RAID is a storage technology that provides increased reliability, among other features, through redundancy. This is accomplished by combining multiple physical storage components (e.g., HDDs, SSDs, etc.) into a logical (i.e., virtual) unit, where data is distributed across the multiple storage components in one of a plurality of ways, generally referred to as "RAID levels." The RAID system 606 more specifically comprises N distinct storage devices denoted 602-1, 602-2, . . . 602-N, where N is an integer greater than one. As previously stated, all storage devices 602-1 through 602-N need not be of the same type. Furthermore, one or more of the storage devices 602-1 through 602-N of the RAID system 606 are assumed to be configured to include apparatus and/or circuitry as disclosed herein. These and other virtual storage systems comprising multiple storage devices (e.g., HDDs, SSDs, or some combination of HDDs and SSDs), are considered embodiments of the invention.

The illustrations of embodiments of the invention described herein are intended to provide a general understanding of the structure of various embodiments, and they are not intended to serve as a complete description of all the elements and features of apparatus and systems that might make use of the structures described herein. Many other embodiments will become apparent to those skilled in the art given the teachings herein; other embodiments are utilized and derived therefrom, such that structural and logical substitutions and changes can be made without departing from the scope of this disclosure. The drawings are also merely representational and are not drawn to scale. Accordingly, the specification and drawings are to be regarded in an illustrative rather than a restrictive sense.

Embodiments of the invention are referred to herein, individually and/or collectively, by the term "embodiment" merely for convenience and without intending to limit the scope of this application to any single embodiment or inventive concept if more than one is, in fact, shown. Thus, although specific embodiments have been illustrated and described herein, it should be understood that an arrangement achieving the same purpose can be substituted for the specific embodiment(s) shown; that is, this disclosure is intended to cover any and all adaptations or variations of various embodiments. Combinations of the above embodiments, and other embodiments not specifically described herein, will become apparent to those of skill in the art given the teachings herein.

The abstract is provided to comply with 37 C.F.R. §1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the appended claims reflect, inventive subject matter lies in less than all features of a single embodiment. Thus the following claims are hereby incorporated into the Detailed Description, with each claim standing on its own as separately claimed subject matter.

Given the teachings of embodiments of the invention provided herein, one of ordinary skill in the art will be able to contemplate other implementations and applications of the techniques of embodiments of the invention. Although illustrative embodiments of the invention have been described herein with reference to the accompanying drawings, it is to be understood that embodiments of the invention are not limited to those precise embodiments, and that various other changes and modifications are made therein by one skilled in the art without departing from the scope of the appended claims.

What is claimed is:

1. A method of operating a multi-reader two-dimensional magnetic recording system, the method comprising: determining a position of a multi-reader head of the multi-reader two-dimensional magnetic recording system; determining an areal density push according to the position; and performing an operation to read data from or write data to a magnetic recording medium according to the areal density push.

2. The method of claim 1, further comprising reading the areal density push data from a zone table of the multi-reader two-dimensional magnetic recording system.

3. The method of claim 2, further comprising: providing a preliminary zone table entry of the zone table comprising a plurality of push dimensions corresponding to a plurality of zones of the magnetic recording medium; and modifying the preliminary zone table entry according to one or more dimensions of the multi-reader head.

4. The method of claim 1, wherein the areal density push is a track push.

5. The method of claim 1, wherein the areal density push is a bit push.

6. The method of claim 1, wherein the position is a skew of the multi-reader head.

7. The method of claim 6, further comprising determining a cross-track separation of a plurality of read-heads of the multi-reader head according to the skew.

8. The method of claim 1, wherein the position is a zone of the magnetic recording medium over which the multi-reader head is disposed.

9. A multi-reader two-dimensional magnetic recording system, the system comprising: a multi-reader head; a device detecting a position of the multi-reader head; a memory device storing a zone table; and a read channel configured to select an areal density push for performing an operation to read data from a magnetic recording medium, the areal density push selected from the zone table corresponding to the position of the multi-reader head and a cross-track separation between read heads of the multi-reader head.

10. The multi-reader two-dimensional magnetic recording system of claim 9, further comprising a motor controlling a rotation of the magnetic recording medium.

11. The multi-reader two-dimensional magnetic recording system of claim 9, wherein the device detecting the position of the multi-reader head is a voice coil motor control module.

12. The multi-reader two-dimensional magnetic recording system of claim 9, wherein the device detecting the position of the multi-reader head is a motor controller.

13. The multi-reader two-dimensional magnetic recording system of claim 9, configured as a device in a redundant array of independent devices (RAID) system.

14. A computer program product embodied in a non-transitory machine-readable medium having machine-readable program code embodied thereon for performing a method of operating a multi-reader two-dimensional magnetic recording system, the method comprising: determining a position of a multi-reader head of the multi-reader two-dimensional magnetic recording system; determining an areal density push according to the position; and performing an operation to read data from or write data to a magnetic recording medium according to the areal density push.

15. The computer program product of claim 14, further comprising reading the areal density push data from a zone table of the multi-reader two-dimensional magnetic recording system.

16. The computer program product of claim 15, further comprising: providing a preliminary zone table entry of the zone table comprising a plurality of push dimensions corresponding to a plurality of zones of the magnetic recording medium; and modifying the preliminary zone table entry according to one or more dimensions of the multi-reader head.

17. The computer program product of claim 14, wherein the areal density push is a track push.

18. The computer program product of claim 14, wherein the areal density push is a bit push.

19. The computer program product of claim 14, wherein the position is a skew of the multi-reader head.

20. The computer program product of claim 19, further comprising determining a cross-track separation of a plurality of read-heads of the multi-reader head according to the skew.

21. The computer program product of claim 14, wherein the position is a zone of the magnetic recording medium over which the multi-reader head is disposed.

22. A data storage system, comprising: a plurality of storage devices, wherein at least one of the plurality of storage devices comprises: a multi-reader head; a device detecting a position of the multi-reader head; a memory device storing a zone table; and a read channel configured to select an areal density push for performing an operation to read data from a magnetic recording medium, the areal density push selected from the zone table corresponding to the position of the multi-reader head and a cross-track separation between read heads of the multi-reader head.

23. The data storage system of claim 22, wherein the at least one of the plurality of storage devices is configured as a device in a redundant array of independent devices (RAID) system.

24. The data storage system of claim 22, wherein the data storage system is configured as a multi-reader two-dimensional magnetic recording system.

* * * * *